Oct. 11, 1960
E. O. OLSEN
2,956,234
INDUSTRIAL PROCESS CONTROL APPARATUS
Filed April 30, 1958
2 Sheets-Sheet 1
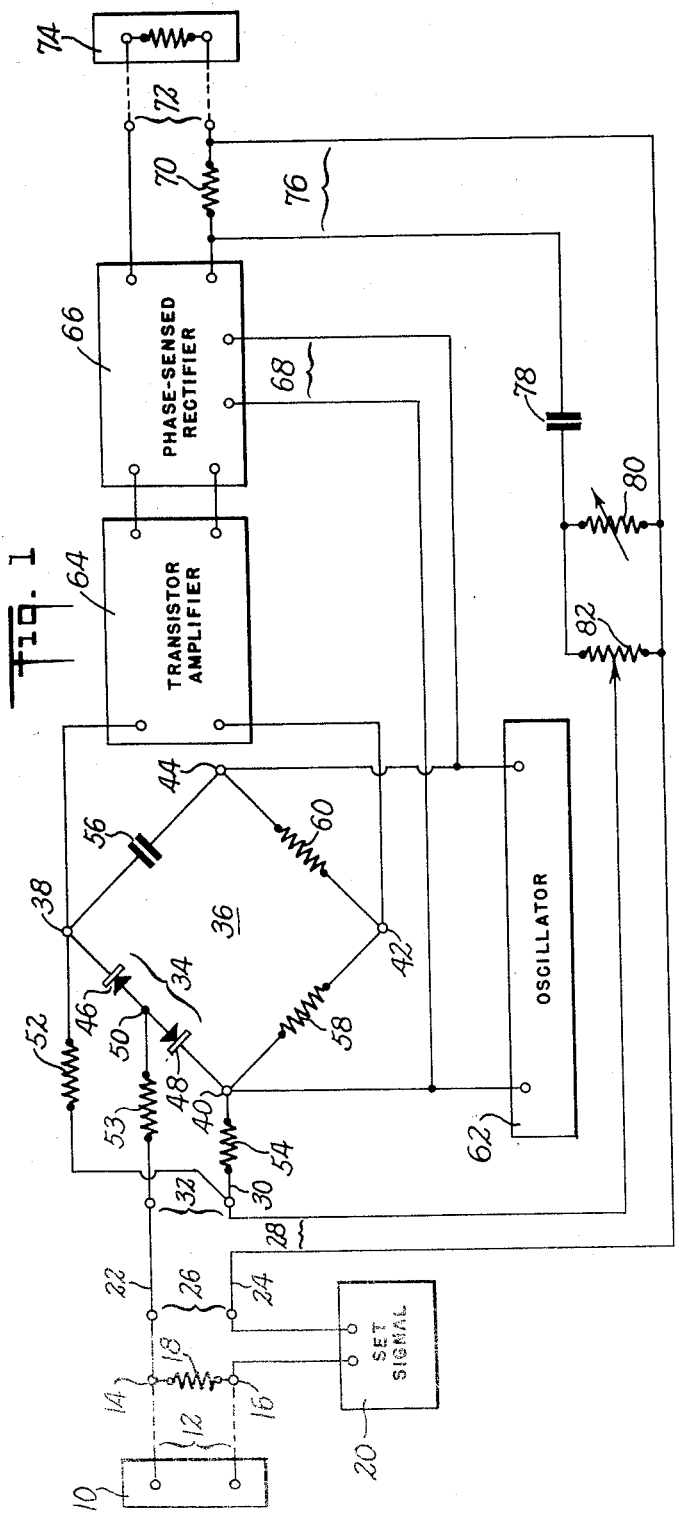
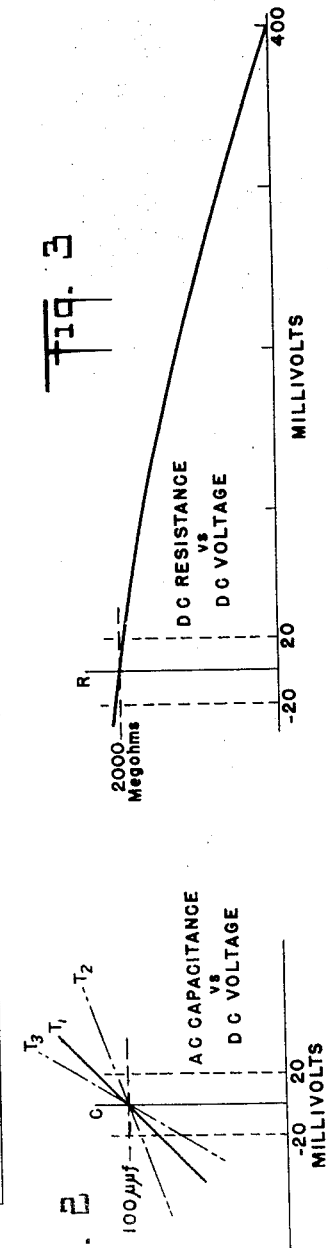
INVENTOR
*Everett O. Olsen*
BY
*Curtis Morris & Safford*
ATTORNEY

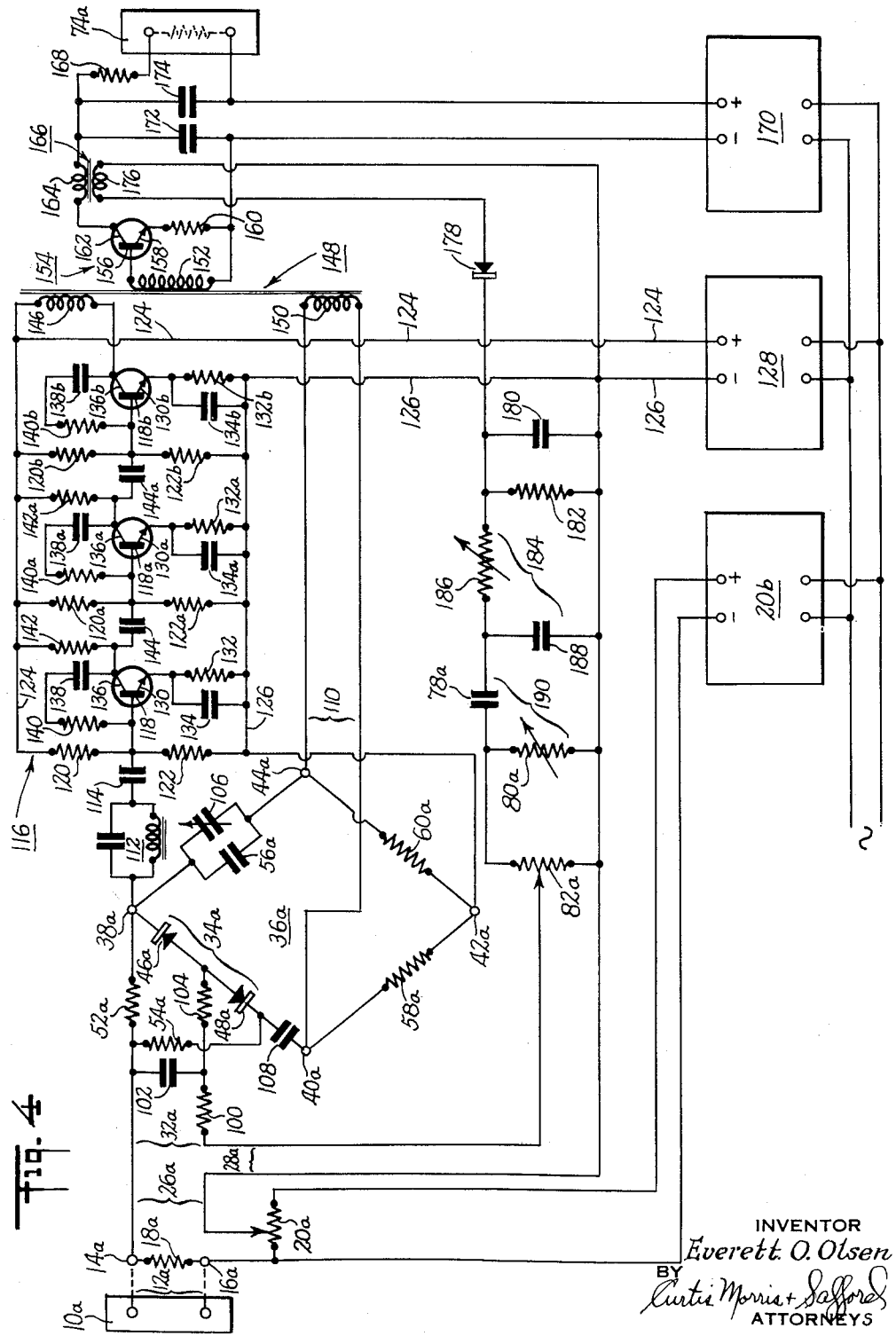

United States Patent Office 2,956,234
Patented Oct. 11, 1960

2,956,234
INDUSTRIAL PROCESS CONTROL APPARATUS

Everett O. Olsen, Wrentham, Mass., assignor to The Foxboro Company, Foxboro, Mass., a corporation of Massachusetts Filed Apr. 30, 1958, Ser. No. 732,102
19 Claims. (Cl. 330—10)

This invention relates to apparatus for controlling a variable condition of an industrial process, for example a process condition such as temperature, rate of liquid flow and the like. More in particular, this invention relates to improvements in control apparatus that is arranged to receive an electrical input signal furnished by a condition sensing device, and to produce a corresponding electrical output signal for transmission to a remotely-located process valve, etc. In accordance with the present invention, there is provided a reliable general-purpose process controller of the proportioning type which is constructed of simple and relatively inexpensive components adapted to operate continuously for long periods of time under severe environmental conditions.

Electrically-operated controllers of various kinds have, of course, been available for many years. Predominantly, prior process controllers of this class have employed vacuum tubes for amplifying the input signal and for developing an output control signal of sufficient power to operate the process valve. However, these prior controllers are complex and expensive to manufacture, and thus have found only limited utility. Moreover, vacuum tubes inherently are relatively fragile, and generally are unsuited for use in industrial applications where reliability and longevity are important objectives.

Because of these difficulties with vacuum tubes, it has been suggested that use be made of other available amplifying devices that are simple and rugged in construction, and that have reliable long life characteristics. Transistor or magnetic amplifiers, for example, are among those that meet these requirements. However, prior to the present invention it has not been possible to provide a fully satisfactory electrical controller using such amplifiers, primarily because of the difficulty of obtaining a sufficiently long-time "reset" action in the controller output signal. Since the problems of obtaining reset action are closely related to the present invention, a brief review of the reasons for and the nature of the reset control function will first be presented.

As is well known, a proportioning-type controller serves to adjust the process valve to a position that is proportional to the value of the measured process condition. If the measured condition varies from its "set point," due to a change in load on the process, a corresponding "error" signal is fed to the controller which thereupon acts to counteract the load change by shifting the process valve so as to tend to return the process condition to its set point. Of course, such a controller cannot bring the condition back exactly to the set point, for at that point there would be no error signal for maintaining the process valve at its new position. The variation of the controlled condition with changes in load on the process is generally referred to as "droop," and one important objective in designing a controller is to minimize the amount of this "droop."

How closely a given controller can hold the process condition to its set point, i.e. how little "droop" the controller permits, is determined in part by the amount of amplification or "gain" built into the controller. Ideally a controller should have very high gain so that it can shift the process valve a large amount in response to a relatively small change in the measured condition, and thus tend to hold the process condition closely to its set point. Such a controller is said to have a "narrow" proportioning band. However, when such a controller is used with many types of processes, particularly those having long time lags, the controller causes instability and hence is ineffective. For that reason, controllers having a relatively wide proportioning band frequently must be used in order to obtain effective control.

For those controllers having a relatively wide proportioning band, reset action is provided to minimize "droop" of the process condition. In a controller having reset action, the initial change in the controller output signal in response to a change in the process condition is relatively small, i.e. the gain of amplification is initially low. However, the reset apparatus subsequently causes the controller output signal to slowly increase (or decrease, depending upon the direction of the process change) over a relatively long time period following the change in load on the process. Thus the process valve is gradually shifted further in the desired corrective direction, and the measured process condition ultimately is brought back very nearly to its set point without producing any instability in the process.

In electrical controllers, reset action can conveniently be obtained by feeding the error signal to an amplifier having a negative feedback circuit wherein the magnitude of the feedback signal is gradually diminished. As the negative feedback action decreases, the effective forward gain of the amplifier is increased, and as a result the change in the controller output signal is correspondingly augmented. This effect can be achieved in a very simple manner by using an electrical reactance element in the feedback circuit, for example a series capacitor arranged to charge (and discharge) through a shunt resistor.

In order to obtain reset action which operates over relatively long periods of time, e.g. 30 minutes, it has been found desirable to use a negative feedback circuit having a very high effective impedance. For example, if a series capacitor of 20 microfarads is employed, a shunt resistance of about 100 megohms must be used to obtain a 30 minute reset time. (Although it is theoretically possible to reduce the required resistance of the shunt resistor by correspondingly increasing the capacitance of the series capacitor, as a practical matter this cannot be done because available capacitors having suitable electrical characteristics are too bulky for this application.)

One important problem that is encountered when such a high-impedance feedback circuit is used with "tubeless" amplifiers, e.g. those using transistors or magnetic devices, results from the fact that such amplifiers typically have a very low input impedance. For example, a conventional transistor amplifier may have an input impedance of about 2000 ohms, and will draw a relatively substantial amount of current from any source of voltage that is connected to it. Thus, the amplifier input impedance will effectively short-circuit a high-impedance feedback circuit, e.g. by providing a low-impedance path around the shunt resistor used to control the charging rate of the series capacitor. For that reason, it has not been possible heretofore to obtain, in any simple and economical manner, long-time reset action in controllers employing such low-impedance amplifiers.

It is an object of the present invention to solve the above problems and to provide an electrically-operated process controller that is superior to those used heretofore. It is a further object of this invention to provide such a controller that is rugged in construction and reliable in operation. It is a still further object of this invention to provide a controller having a long-time reset action, and using a low-impedance amplifier of the transistor type. Other objects, advantages and aspects of the present invention will be in part pointed out in, and in part apparent from, the following description considered together with the accompanying drawings, in which:

Figure 1 is a schematic diagram, partly in block form, showing one embodiment of the invention;

Figure 2 is a graph which indicates (very approximately) the variation in the junction capacitance of a semiconductor diode, for various temperatures, with changes in the D.-C. voltage applied across the diode;

Figure 3 is a graph showing the variation of the D.-C. resistance of a semiconductor diode with changes in the D.-C. voltage applied across the diode; and Figure 4 is a schematic diagram showing a modified form of the invention.

Referring now to the upper left-hand corner of Figure 1, there is shown a remote transmitter unit generally indicated at 10 and adapted to produce a D.-C. measurement signal in accordance with the value of a variable process condition such as temperature. This transmitter may be of the usual type, and preferably is arranged to produce a measurement signal in the form of a current within the range of 10 to 50 milliamperes. This signal is fed along a transmission line 12 (which may be of substantial length) to the input terminals 14 and 16 of a process controller arranged to maintain the measured condition at a preset level.

This controller is of the general type that is adapted to develop, for transmission to a process valve or the like, an output signal which includes the control effects commonly referred to as "proportioning" and "reset." More specifically, if the measured process condition deviates from its desired level, the output signal of this controller will initially change a corresponding amount so as to provide proportioning action. Thereafter, the output signal will continue to change slowly in the same direction and thus gradually increase the control action until the process condition has been reset to its desired level. The manner in which these control effects are developed will be apparent as the description proceeds.

Connected across the controller input terminals 14 and 16 is a resistor 18, e.g. of 100 ohms, adapted to produce a D.-C. measurement voltage in the range of 1 to 5 volts in accordance with the output current from the transmitter 10. This measurement voltage is coupled in series-opposition to a "set signal" produced by a conventional regulated D.-C. power supply 20 (e.g. adapted to produce a set signal that is adjustable between 1 and 5 volts), and which is connected to the lower input terminal 16.

When the measured process condition is at the desired level, i.e. the "set point," the measurement voltage across the resistor 18 will be equal in magnitude and opposite in polarity to the set signal produced by the power supply 20. When the process condition varies from its set point so that the measurement voltage no longer equals the set signal, a D.-C. "error" or "deviation" signal will be produced across the controller input leads 22 and 24, i.e. at the circuit point identified in the drawing by reference 26. The magnitude of this deviation signal is determined by the extent to which the process condition has varied from its set point, and the polarity of the deviation signal is determined by whether the condition has varied above or below the set point.

The D.-C. deviation signal appearing across the controller input leads 22 and 24 is combined with a D.-C. rebalancing signal (developed by a negative feedback circuit 28 to be described) to produce a D.-C. null balance signal between input lead 22 and another input lead 30, i.e. at the circuit point identified in the drawing by reference 32. This null balance signal is fed to one arm 34 of an A.-C. bridge 36 having four terminals 38, 40, 42 and 44.

The bridge arm 34 consists of two semiconductor diodes 46, 48 (e.g. silicon diodes type 651 as supplied by Texas Instruments, Inc.) which are connected in series, "back-to-back" fashion. The adjacent electrodes of these diodes are connected from a common circuit point 50 through an isolation resistor 53 (ten megohms) to the input lead 22. The remote diode electrodes are connected to the respective bridge terminals 38 and 40 which, in turn, are connected through corresponding isolation resistors 52 and 54 (each of ten megohms) to the other input lead 30. Thus, the null balance signal at circuit point 32 is applied across both diodes.

Each of the semiconductor diodes 46, 48 in the bridge arm 34 forms, in effect, an electrical capacitor. Although the theoretical basis for this capacitance effect may not be fully understood at the present time, apparently it is due at least in part to the tendency for electrical charges to accumulate adjacent the interface between the two dissimilar materials of which such a diode is formed. In any event, as shown in the graph of Figure 2, the junction capacitance of these diodes varies with changes in D.-C. voltage applied thereto. In this graph, the solid line $T_1$ shows approximately how the diode capacitance varies with applied voltage at room temperature, while the broken lines $T_2$ and $T_3$ indicate approximately how this capacitance varies at temperatures above and below room temperature.

Within the range of plus or minus 20 millivolts around zero, the capacitance of one of the diodes is about 100 micro-microfarads. However, this capacitance continuously increases (about 4% at room temperature) as the applied voltage is made more positive over the 40 millivolt range. Moreover, all of the three lines $T_1$, $T_2$, $T_3$ cross the zero voltage line at effectively the same point, so that variations in temperature of the diodes, provided the voltage is close to zero, will not have any substantial effect on the capacitance. It has been found that, within the 40 millivolt range around zero, the capacitance will vary less than about 1% (depending somewhat upon the particular diode selected) if the ambient temperature is changed by 50° F.

Referring again to Figure 1, the bridge 36 also includes a conventional capacitor 56 having a capacitance substantially equal to that of the diodes 46, 48 when connected together in series. The remaining two arms of the bridge consist of resistors 58 and 60 having equal electrical resistances of about 150 ohms.

The bridge 36 is energized by an oscillator 62, the output of which is connected to the bridge terminals 40 and 44. This oscillator is of the usual type, such as one employing a transistor with suitable tuned circuits, and is adapted to produce an A.-C. signal having a frequency, for example, of 100 kilocycles per second or higher. The "back-to-back" arrangement of the diodes 46, 48 assures that the A.-C. impedance of the bridge arm 34 is uniform throughout the A.-C. energizing cycle.

When the bridge 36 is balanced, i.e. when the capacitance of the diodes 46, 48 is exactly equal to that of the capacitor 56, there will be no voltage between the bridge terminals 38 and 42. However, if the capacitance of the diodes changes, the bridge will be unbalanced and a corresponding A.-C. bridge output signal will appear across terminals 38, 42. The magnitude of this output signal will be proportional to the amount of capacitance change, and the phase of this signal (relative to the phase of the oscillator output) will be determined by the direction in which the diode capacitance changed, i.e. whether this capacitance increased or decreased.

The bridge output signal is fed from terminals 38, 42 to a high-gain transistor amplifier 64 of conventional design, e.g. having an input impedance of about 2000 ohms, which supplies an intensified A.-C. signal to a phase-sensed rectifier circuit generally indicated at 66. This rectifier circuit also is of the usual type, such as one employing dry rectifiers, and is furnished with a phase comparison signal from the oscillator 62 by means of a pair of wires 68.

The phase-sensed rectifier circuit 66 provides a D.-C. output signal within the range of 10 to 50 milliamps. The magnitude of this output signal is determined by the amplitude and phase of the A.-C. signal produced by the bridge 36 and, in the particular embodiment described herein, the D.-C. output is maintained at 30 milliamps. (e.g. by means of the usual biasing arrangement) when there is no A.-C. signal produced by the bridge. When the bridge produces an output signal that is, for example, in phase with the oscillator output, the D.-C. output current from the phase-sensed rectifier will be increased over the nominal 30 milliamp. level; while if the bridge produces an output signal of opposite phase, the D.-C. output current will be decreased from this level.

The D.-C. output current produced by the phase-sensed rectifier 66 is fed through a feedback resistor 70 (having a resistance of about 100 ohms) and through a transmission line 72 to a valve-operating device generally indicated at 74. This latter device is arranged (by conventional means not shown herein) to adjust a characteristic of the process being controlled in accordance with changes in the level of D.-C. output current from the controller, so as to maintain the measured condition of the process at a nearly constant level.

In order to provide the controller output signal with reset action, a portion of this output signal is fed back to the controller input through a negative feedback circuit which produces a feedback signal that varies with time. For this purpose, the feedback resistor 70 is connected by a pair of wires 76 to a series reset capacitor 78 (e.g. 20 microfarads) and a shunt resistance consisting of a variable reset resistor 80 (having a maximum resistance of about 200 megohms) connected in parallel with a proportioning-adjustment potentiometer 82 (having a resistance of about 200 megohms).

Whenever there is a change in current through the feedback resistor 70, i.e. in response to a variation in the measured condition, the corresponding change in voltage across this resistor is fed through the reset capacitor 78 and, initially, appears across the variable resistor 80 and the potentiometer 82. A portion of this voltage is coupled from the movable arm of the potentiometer through the feedback circuit 28 to the input leads 24 and 30. This feedback voltage serves as a rebalancing signal, and is connected in series-opposition to the deviation signal produced at circuit point 26 in response to the variation in the measured condition.

The gain of the amplifier 64 is made sufficiently high that the rebalancing signal produced by the feedback circuit 28 is substantially equal in magnitude to the deviation signal. For example, if the set signal power supply 20 is adjusted to give a 3 volt input (mid-range position) and the output current of the transmitter 10 suddenly changes to its maximum output of 50 milliamps. (5 volts across resistor 18) so as to produce a deviation signal of 2 volts, the feedback circuit 28 will produce a rebalancing signal of about 1.98 volts when the potentiometer 82 is set to its maximum position. Consequently, the null balance signal at circuit point 32, which represents the difference between the deviation signal and the rebalancing signal, will have an initial magnitude of only 20 millivolts, i.e. within the range of plus or minus 20 millivolts referred to in connection with Figure 2.

Subsequently, as the reset capacitor 78 gradually charges up through the variable resistor 80 and the potentiometer 82, the rebalancing signal produced by the feedback circuit 28 gradually drops off and thereby tends to increase the control action of the valve-operating device 74. However, while this signal drops off, the measured process condition will in the meantime be returning to its set point, due to the influence of the device 74 on the process input. Therefore, the deviation signal 26 correspondingly falls off so as normally to maintain the null balance signal at circuit point 32 within the range of plus or minus 20 millivolts.

Referring to Figure 3, it can be seen that the D.-C. resistance of the semiconductor diodes 46, 48 is at a relatively high level when the D.-C. voltage across the diodes is within the range of plus or minus 20 millivolts, and that this resistance decreases to a very low value as the voltage is increased to about 400 millivolts (positive polarity). As mentioned hereinabove, the rebalancing action of the feedback circuit 28 tends to maintain the D.-C. voltage across the diodes within the range of plus or minus 20 millivolts around zero. Hence, the D.-C. resistance of the diodes will be very high so that they will not draw any substantial amount of current from the feedback circuit 28. Therefore, the charge and discharge of the reset capacitor 78 will not be affected appreciably by the bridge 36, and as a result the time-constant of the feedback circuit can be made relatively high by using an inexpensive moderate-sized capacitor in combination with a relatively large shunt resistor.

In addition, the A.-C. impedance of the bridge 36 is only several thousand ohms, so that there is an efficient transfer of power from the bridge to the transistor amplifier which has a correspondingly low input impedance.

With this arrangement, the phase of the bridge output signal indicates whether the measured process condition has increased or decreased in relation to the control set point, and the valve-operating device 74 is readjusted accordingly. For example, if the measurement signal from the transmitter 10 exceeds the set signal from the power supply 20, the phase of the A.-C. bridge output signal will be such as to cause the phase-sensed rectifier output to increase in magnitude. This in turn causes the device 74 to be shifted in such a direction as to reduce the value of the measured process condition. On the other hand, if the transmitter measurement signal drops below the set signal, the bridge output signal will be of opposite phase, and consequently the phase-sensed rectifier output will decrease so as to readjust the device 74 in the opposite direction.

The changes of diode capacitance due to ambient temperature variations do not have any substantial effect on the controller operations, partly due to the fact that the 40 millivolt range of the diodes represents only 1% of full-scale change in output of the transmitter 10. Using the specific circuit elements outlined hereinabove, for example, a change in ambient temperature of 50° F. produces a change in diode capacitance that is equivalent to an input signal change of 10 millivolts, and thus will affect the value of the controlled variable by no more than ¼%.

Figure 4 shows a process controller similar to that shown in Figure 1 but modified to eliminate the need for a separate oscillator and phase-sensed rectifier. In addition, as will be explained, this modified controller includes means for developing "rate" action in the output control signal.

The input circuitry of the Figure 4 controller is generally the same as in Figure 1. That is, a remote transmitter unit 10a provides an output current, in the range of 10 to 50 milliamps., which is fed along the transmission line 12a to the controller input terminals 14a and 16a. A resistor 18a connected across these terminals produces a D.-C. measurement signal which is opposed by a set signal obtained from a manually-adjustable potentiometer 20a energized by a D.-C. power supply 20b. The resulting deviation signal at circuit point 26a is combined with a feedback signal obtained from a negative feedback circuit 28a to produce a D.-C. unbalance signal at circuit point 32a.

The unbalance signal 32a is filtered by a resistor 100 and a capacitor 102, and is coupled through isolation resistors 52a, 54a, 104 to the arm 34a of a bridge 36a having terminals 38a, 40a, 42a and 44a. The bridge arm 34a consists of a pair of semiconductor diodes 46a, 48a connected in back-to-back fashion, and in series with a D.-C. blocking capacitor 108. Between the bridge terminals 38a and 44a is a fixed capacitor 56a in parallel with a trimmer capacitor 106 which is adjustable to provide a predetermined amount of bridge unbalance when the D.-C. voltage across the diodes is zero. The lower left-hand bridge arm consists of a resistance 58a, while the lower right-hand bridge arm consists of a resistor 60a as before.

The bridge terminals 40a and 44a are energized by a positive feedback circuit 110 which, as will be explained, produces at these terminals a high-frequency (100 kilocycles or more) A.-C. signal the magnitude of which varies in accordance with changes in the balance of the bridge 36a. The bridge output terminals 38a, 42a are connected through a "conjugate" matching network 112 and a coupling capacitor 114 to the input of a three-stage transistor amplifier generally indicated at 116. The network 112 is arranged to provide a substantially complete impedance match between the bridge 36a and the input of the amplifier.

All three stages of the amplifier 116 are essentially identical and consequently the elements of only the first stage will be described herein in detail. Similar elements in the remaining two stages are identified with the same reference numerals and differentiating suffixes.

The base electrode 118 of the first transistor is biased to the required operating potential by a voltage divider consisting of resistors 120 and 122. These resistors are connected respectively to positive and negative power leads 124 and 126 which in turn are connected to corresponding terminals of a D.-C. power supply generally indicated at 128. The emitter electrode 130 is connected to the negative power lead 126 through the usual biasing network consisting of a resistor 132 and capacitor 134.

The collector electrode 136 is coupled back to the base electrode by a stabilizing feedback circuit consisting of a series-connected capacitor 138 and resistor 140. The collector electrode also is connected through a load resistor 142 to the positive power lead 124. The A.-C. signal on the collector electrode is coupled through a capacitor 144 to the base electrode 118a of the succeeding stage of amplification.

The amplified A.-C. signal on the collector electrode 136b of the third transistor is fed through the primary winding 146 of an output transformer 148 which also includes a feedback winding 150 and an output winding 152. The feedback winding is connected through the feedback circuit 110 to the bridge terminals 40a and 44a.

When the D.-C. voltage across the diodes 46a, 48a, is zero, the bridge 36a is arranged to be unbalanced (as by adjusting the trimmer capacitor 106) in such a direction as to produce positive feedback around the amplifier 116. Consequently, in this condition the amplifier will develop oscillations (preferably of a relatively high freuency such as 100 kc. or more) and a corresponding A.-C. signal will appear in the output winding 152 of the transformer 148.

When the balance of the bridge 36a is changed, as by applying a D.-C. voltage of either polarity to the diodes 46a, 48a, the amplitude of the A.-C. output signal will change a corresponding amount (either up or down, depending upon the polarity of the D.-C. voltage). Such a change in bridge balance alters the attenuation in the positive feedback path around the amplifier 116 and, apparently because of non-linear behavior of the amplifier, thereby serves to control the oscillation amplitude. The non-linear behavior of the amplifier may reflect the fact that the gain of the amplifier decreases with increasing amplitude of the A.-C. input signal, although this non-linear behavior may also result from the change in gain or phase shift of the amplifier that occurs with variations in frequency of the A.-C. signal as the bridge balance is changed.

In any event, the bridge 36a is arranged in such a manner that it is unbalanced throughout the full-scale range of D.-C. input signal variation across the diodes 46a, 48a, so that oscillations will be maintained throughout this range. These oscillations are coupled from the output windings 152 of the transformer 148 to a power amplifier stage consisting of a transistor 154. For this purpose, the base electrode 156 of this transistor is connected to the upper end of the transformer winding, while the emitter electrode 158 is connected through a resistor 160 to the lower end of the winding.

The collector electrode 162 of the transistor 154 is connected through a winding 164 of a feedback transformer 166, through a current limiting resistor 168, and through a resistive load 74a (shown in dotted outline to represent the resistance of a transmission line and associated valve-operating device) to one terminal of a D.-C. power supply generally indicated at 170. The other power supply terminal is connected to the lower end of the transformer winding 152. Filter capacitors 172 and 174 are provided to smooth out the D.-C. current flowing through the load 74a.

The current flowing through the winding 164 is pulsating, and has an average magnitude which corresponds to the amplitude of oscillations in the amplifier 116. This pulsating current induces in a secondary winding 176 a corresponding A.-C. signal which produces a flow of current through a half-wave rectifier 178. This rectifier develops a corresponding D.-C. feedback voltage which is filtered by a capacitor 180 having a bleeder resistor 182 connected in parallel. The filtered D.-C. voltage is applied to a rate-generating network 184 consisting of a series variable resistor 186 connected to a shunt rate capacitor 188.

From the rate generating circuit 184, the D.-C. feedback voltage is fed to a reset-generating circuit 190 similar to that used in the Figure 1 embodiment, i.e. this circuit includes a series reset capacitor 78a in combination with a shunt variable resistor 80a. The signal produced by the reset generating circuit is fed to a "proportioning" potentiometer 82a and thence through the feedback circuit 28a to the input circuit of the controller.

Considering now the overall operation of the Figure 4 controller, the balance of the bridge 36a is adjusted (as by means of the trimmer capacitor 106) to provide an output current of 30 milliamps. through the load 74a when there is no D.-C. voltage across the diodes 46a, 48a. Assuming now that there is a sudden increase in the output of the transmitter 10a, a corresponding deviation signal will be fed to the diodes of the bridge 36a. The capacitance of these diodes is thereby increased (as described in connection with the Figure 1 embodiment) so that the bridge is further unbalanced. This reduces the attenuation in the positive feedback circuit 110 around the amplifier 116, and thus tends to increase the amplitude of the A.-C. oscillations in this amplifier. This increased A.-C. signal is amplified by the power transistor 154 which produces a corresponding increase in the pulsating current flowing through the transformer winding 164 and the load 74a.

Consequently, the D.C. voltage produced by the rectifier 178 is correspondingly increased to produce a flow of current through the resistor 186 and into the rate capacitor 188. Instantaneously, of course, the voltage across this capacitor cannot change and, therefore, the voltage across the proportioning potentiometer 82a will correspondingly be unchanged at the instant the deviation signal is applied to the bridge 36a. As a result, there will initially be no rebalancing signal in the feedback circuit 28a, and hence the bridge 36a will be unbalanced to a considerable extent so as to produce a relatively large output signal change through the load 74a. The magnitude of this initial output signal change, moreover, is proportional to the rate at which the process condition is varying, and thereby the controller is enabled to produce an immediate and large corrective effect if the process is changing rapidly.

As the shunt rate capacitor 188 charges up through the series resistor 186 (which occurs fairly rapidly after the variation in the process condition), the resulting change in voltage across this capacitor produces a signal which is coupled through the reset capacitor 78a to produce a rebalancing signal in the feedback circuit 28a. Accordingly, as this rebalancing signal grows in magnitude, the output signal of the controller will correspondingly diminish from its initially large value.

Subsequently, as the reset capacitor 78a charges up through the reset resistor 80a (which normally takes a very long time relative to the time required for operation of the rate generating network 184), the rebalancing signal from the feedback circuit 28a gradually drops off, as in the Figure 1 embodiment. Therefore, the output current through the load 74a will tend to increase so as to augment the control action, until ultimately the process condition returns substantially to its set point.

The Figure 4 embodiment is arranged to provide a full scale change in D.-C. output current (i.e. from 10 to 50 milliamps.) for a change of from minus to plus 10 millivolts across the diodes 46a, 48a. It should also be noted that the bridge 36a is unbalanced throughout this 20 millivolt input voltage range.

The use of a relatively high A.-C. energizing frequency in the controller, rather than for example the conventional 60 cycle energization, provides several important advantages. In particular, the controller response to a change in the process condition will be more rapid, and thus assure better control of the process. Also, the problems of 60 cycle pick up and instability effects are substantially minimized. Moreover, the various component parts of the controller will be smaller and generally less expensive.

Although specific preferred embodiments of the invention have been described in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Industrial process control apparatus of the type adapted to furnish an electrical control signal, and wherein the control signal varies in such a manner as to provide a resetting action operable over a relatively long period of time to slowly increase the control effectiveness, said apparatus comprising, in combination, an input circuit arranged to receive a D.-C. input signal which varies in accordance with the value of the process condition to be controlled, a sensing network including a voltage-controlled capacitor element coupled to said input circuit, said capacitor element being arranged to establish an electrical capacitance which varies in accordance with the D.-C. voltage applied thereto without drawing any substantial current from the source of said D.-C. coltage, supply means for feeding an A.-C. energizing signal to said sensing network, a pair of output terminals for said network, said network including means cooperating with said voltage-controlled capacitor element to produce at said output terminals an A.-C. output signal which varies in response to changes in the capacitance of said capacitor element, rectifier means coupled to said network output terminals for producing a D.-C. output signal in accordance with said A.-C. output signal, an output circuit for developing a control signal corresponding to said D.-C output signal, a reset circuit having a relatively high internal impedance, said reset circuit being connected to said rectifier means to produce a D.-C. feedback signal in accordance with said D.-C. output signal, said reset circuit further being arranged to couple said feedback signal to said input circuit in series-opposition to said D.-C. input signal, whereby the D.-C. voltage across said voltage-controlled capacitor element represents the difference between said D.-C. input signal and said D.-C. feedback signal, and a reactance element in said feedback circuit arranged to gradually alter the magnitude of said feedback signal over a period of time and thereby produce reset action in said control signal.

2. Industrial process control apparatus of the type adapted to furnish an electrical control signal, and wherein the control signal varies in such a manner as to provide a resetting action operable over a relatively long period of time to slowly increase the control effectiveness, said apparatus comprising, in combination, an input circuit arranged to receive a D.-C. input signal which varies in accordance with the value of the process condition to be controlled, a sensing network including at least one semiconductor element coupled to said input circuit, said semiconductor element being arranged to establish an electrical capacitance which varies in accordance with the D.-C. voltage applied thereto without drawing any substantial current from the source of said D.-C. voltage, supply means for feeding an A.-C. energizing signal to said sensing network, a pair of output terminals for said network, said network including means cooperating with said semiconductor element to produce at said output terminals an A.-C. output signal which varies in response to changes in the capacitance of said semiconductor element, rectifier means coupled to said network output terminals for producing a D.-C. output signal in accordance with said A.-C. output signal, an output circuit for developing a control signal corresponding to said D.-C. output signal, a reset circuit having a relatively high internal impedance, said reset circuit being connected to said rectifier means to produce a D.-C. feedback signal in accordance with said D.-C. output signal, said reset circuit further being arranged to couple said feedback signal to said input circuit in series-opposition to said D.-C. input signal, whereby the D.-C. voltage across said semiconductor element represents the difference between said D.-C. input signal and said D.-C. feedback signal, and a reactance element in said feedback circuit arranged to gradually alter the magnitude of said feedback signal over a period of time and thereby produce reset action in said control signal.

3. Apparatus as claimed in claim 2, wherein said reactance element consists of a series capacitor, and a variable shunt resistor connected to said series capacitor to permit an adjustment of the rate at which said feedback signal is altered.

4. Industrial process control apparatus of the type adapted to provide an electrical control signal including reset action operable over a relatively long period of time, comprising, in combination, an input circuit arranged to receive a D.-C. input signal in accordance with the value of the process condition to be controlled, a bridge network including in one arm thereof a semiconductor element which is connected to said input circuit, said semiconductor element having a very high electrical resistance and arranged to establish an electrical capacitance the magnitude of which varies in accordance with changes in D.-C. voltage applied thereto without drawing any substantial current from the D.-C. voltage source, an electrical impedance element in another arm of said bridge, said last-mentioned bridge arm being connected to said one arm, A.-C. supply means for feeding an A.-C. energizing signal across the series combination of both of said bridge arms, a pair of output terminals for said bridge to provide an A.-C. output signal the amplitude of which varies in response to changes in the capacitance of said semiconductor element, rectifier means coupled to said output terminals for producing a D.-C. output signal corresponding to said A.-C. output signal, an output circuit for developing a control signal corresponding to said D.-C. output signal, a reset circuit arranged to produce a D.-C. feedback signal in accordance with said D.-C. output signal, said reset circuit being coupled to said input circuit to connect said feedback signal in series-opposition to said D.-C. input signal, whereby the D.-C. voltage across said semiconductor element represents the difference between said D.-C. input signal and said D.-C. feedback signal, a series reset capacitor in said feedback circuit, and a shunt resistor of relatively high ohmic resistance connected to said capacitor, said resistor cooperating with said reset capacitor to gradually decrease the magnitude of said feedback signal over a relatively long period of time and thereby produce reset action in said control signal.

5. Industrial process control apparatus of the type adapted to provide an electrical control signal including reset action operable over a relatively long period of time, comprising, in combination, an input circuit arranged to receive a D.-C. input signal in accordance with the value of the process condition to be controlled, a bridge network including in one arm thereof a semiconductor element which is connected to said input circuit, said semiconductor element having a very high electrical resistance and arranged to establish an electrical capacitance the magnitude of which varies in accordance with changes in D.-C. voltage applied thereto without drawing any substantial current from the D.-C. voltage source, an electrical impedance element in another arm of said bridge, said last-mentioned bridge arm being connected to said one arm, A.-C. supply means for feeding an A.-C. energizing signal across the series combination of both of said bridge arms, a pair of output terminals for said bridge to provide an A.-C. output signal the amplitude of which varies in response to changes in the capacitance of said semiconductor element, an A.-C. amplifier having a relatively low input impedance and connected to said output terminals, rectifier means coupled to the output of said amplifier for producing a D.-C. output signal corresponding to said A.-C. output signal, a controller output circuit for developing a control signal corresponding to said D.-C. output signal, a reset circuit arranged to produce a D.-C. feedback signal in accordance with said D.-C. output signal, said reset circuit being coupled to said input circuit to connect said feedback signal in series-opposition to said D.-C. input signal, whereby the D.-C. voltage across said semiconductor element represents the difference between said D.-C. input signal and said D.-C. feedback signal, a series reset capacitor in said feedback circuit, and a shunt resistor of relatively high ohmic resistance connected to said capacitor, said resistor cooperating with said reset capacitor to gradually decrease the magnitude of said feedback signal over a relatively long period of time and thereby produce reset action in said control signal.

6. Apparatus as claimed in claim 5, wherein said bridge network is balanced when the D.-C. voltage on said semiconductor element is zero, said rectifier means comprising a phase-sensed rectifier adapted to produce a D.-C. output signal in accordance with the amplitude and phase of said A.-C. output signal.

7. An industrial process controller adapted to receive an electrical input signal and to produce a corresponding electrical control signal, comprising, in combination, an A.-C. amplifier, a positive feedback circuit connected around said amplifier to produce electrical oscillations therein, a sensing network forming part of said positive feedback circuit and including variable attenuation means to control the amplitude of said oscillations, said variable attenuation means comprising a voltage-controlled capacitor the capacitance of which varies with the magnitude of D.-C. voltage applied thereto, an input circuit for feeding to said voltage-controlled capacitor a D.-C. input signal the magnitude of which is representative of the valve of the process condition being controlled, a negative feedback circuit for said A.-C. amplifier, said negative feedback circuit including a rectifier to produce a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, and an output circuit for said controller for producing a control signal in accordance with the amplitude of said electrical oscillations.

8. An industrial process controller of the type adapted to produce an electrical control signal, said controller comprising, in combination, an A.-C. amplifier, a positive feedback circuit coupling the amplifier output to the amplifier input and arranged to produce electrical oscillations therein, a sensing network forming part of said positive feedback circuit and including variable attenuation means to control the amplitude of said oscillations, said variable attenuation means comprising a voltage-controlled capacitor the capacitance of which varies with the magnitude of D.-C. voltage applied thereto, an input circuit for feeding to said voltage-controlled capacitor a D.-C. input signal the magnitude of which is representative of the value of the process condition being controlled, a negative feedback circuit for said A.-C. amplifier, said negative feedback circuit including a rectifier to produce a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, an output circuit for said controller for producing a control signal in accordance with the amplitude of said electrical oscillations, and an electrical reactance element in said negative feedback circuit to gradually decrease the magnitude of said D.-C. feedback signal and thereby produce reset action in said control signal.

9. An industrial process controller adapted to receive an electrical input signal and to produce an electrical control signal, comprising, in combination, an A.-C. amplifier having a relatively low input impedance, a positive feedback circuit coupling the amplifier output and input together and arranged to produce electrical oscillations, a sensing network forming part of said positive feedback circuit and including variable attenuation means to control the amplitude of said oscillations, said variable attenuation means comprising at least one semiconductor diode the capacitance of which varies with the magnitude of D.-C. voltage applied thereto, an input circuit for feeding to said semiconductor diode a D.-C. input signal the magnitude of which is representative of the deviation of the process condition from a predetermined set value, a negative feedback circuit for said A.-C. amplifier, said negative feedback circuit having a high internal impedance relative to the input impedance of said A.-C. amplifier, a rectifier in said negative feedback circuit for producing a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, an output circuit for said controller for producing a control signal in accordance with the amplitude of said electrical oscillations, and electrical reactance and resistive elements connected in said negative feedback circuit to cause the magnitude of said D.-C. feedback signal to gradually diminish over a relatively long period of time and thereby produce reset action in said control signal.

10. Industrial process control apparatus adapted to receive an electrical input signal from a remote transmitter and comprising, in combination, an A.-C. amplifier, a positive feedback circuit for coupling the amplifier output to the amplifier input and arranged to produce electrical oscillations therein, a bridge network forming part of said positive feedback circuit and serving as a variable attenuation means to control the amplitude of said oscillations, said bridge network including in one of its arms a semiconductor diode the capacitance of which varies with the magnitude of D.-C. voltage applied thereto, an input circuit for feeding to said semiconductor diode a D.-C. input signal the magnitude of which is representative of the value of the process condition being controlled, a negative feedback circuit for said A.-C. amplifier, said negative feedback circuit including a rectifier to produce a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, an output circuit for said controller for producing a control signal in accordance with the amplitude of said electrical oscillations, and a series capacitor and shunt resistor combination in said negative feedback circuit to gradually reduce the magnitude of said negative feedback signal whereby to introduce resetting action into said control signal.

11. An industrial process controller adapted to receive an electrical input signal and comprising, in combination, a multi-stage A.-C. amplifier including a transistor amplifier in the first stage thereof, said transistor amplifier having a relatively low input impedance, a positive feedback circuit coupling the amplifier output and input together for producing electrical oscillations therein, a bridge network forming part of said positive feedback circuit and serving as a variable attenuation means to control the amplitude of said oscillations, said bridge network including in one of its arms a semiconductor diode the capacitance of which varies with the magnitude of D.-C. voltage applied thereto; the D.-C. resistance of said semiconductor diode, when the D.-C. voltage thereacross is within a narrow range around zero volts, being substantially greater than the input impedance of said transistor amplifier; an input circuit for feeding to said semiconductor diode a D.-C. input signal the magnitude of which is representative of the value of the process condition being controlled, a negative feedback circuit for said A.-C. amplifier, said negative feedback circuit including a rectifier to produce a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, so as to tend to maintain the D.-C. voltage across said diode within said narrow range around zero volts, an output circuit for said controller for producing a control signal in accordance with the amplitude of said electrical oscillations, and a series capacitor and shunt resistor combination in said negative feedback circuit to gradually reduce the magnitude of said negative feedback signal whereby to introduce resetting action into said control signal, the ohmic resistance of said shunt resistor being substantially greater than the input impedance of said transistor amplifier.

12. An industrial process controller adapted to receive an electrical input signal and comprising, in combination, an A.-C. amplifier, a positive feedback circuit coupling the amplifier output to the amplifier input and arranged to produce electrical oscillations therein, a bridge network forming part of said positive feedback circuit and serving as variable attenuation means to control the amplitude of said oscillations, said bridge network having in one of its arms a semiconductor diode the capacitance of which varies with the magnitude of D.-C. voltage applied thereto, said bridge having in another of its arms an impedance element which approximately balances the impedance of said one arm, said bridge normally being unbalanced when the D.-C. voltage across said diode is zero so as to produce oscillations in said amplifier, an input circuit for feeding to said semiconductor diode a D.-C. input signal the magnitude and polarity of which are representative of the value of the process condition being controlled, a negative feedback circuit for said A.-C. amplifier, said negative feedback circuit including a rectifier to produce a D.-C. negative feedback signal corresponding in magnitude to the amplitude of oscillations in said A.-C. amplifier, said negative feedback circuit being arranged to couple said D.-C. feedback signal to said input circuit in series-opposition to said D.-C. input signal, an output circuit for said controller for producing a control signal in accordance with the amplitude of said electrical oscillations, and a reactance element in said negative feedback circuit to introduce reset action into said control signal.

13. Industrial process control apparatus of the type adapted to provide an electrical control signal including reset action operable over a relatively long period of time, comprising, in combination, an input circuit arranged to receive a D.-C. input signal in accordance with the value of the process condition to be controlled, a sensing network including a voltage-controlled capacitor element connected to said input circuit, said element being arranged to establish an electrical capacitance the magnitude of which varies in accordance with the D.-C. voltage applied thereto, energizing circuit means for feeding an A.-C. energizing signal to said sensing network, a pair of output terminals forming part of said sensing network; said network further including means cooperating with said voltage-controlled capacitor element to produce, when said network is energized, an A.-C. output signal the amplitude and phase of which, relative to the amplitude and phase of said A.-C. energizing signal, are determined by the capacitance of said capacitor element; an A.-C. amplifier coupled to said sensing network output terminals to intensify said A.-C. output signal, a first feedback circuit coupled to the output of said A.-C. amplifier and arranged to feed a portion of the intensified A.-C. output signal through said energizing circuit means to said sensing network, said sensing network being arranged to produce positive feedback in an amount which varies in accordance with the capacitance of said voltage-controlled capacitor element, so as to produce through said A.-C. amplifier electrical oscillations the magnitude of which are determined by the magnitude of D.-C. voltage applied to said voltage-controlled capacitor element, rectifier means coupled to the output of said A.-C. amplifier for producing a D.-C. output signal corresponding to said electrical oscillations, a second feedback circuit arranged to produce a D.-C. negative feedback signal corresponding to said D.-C. output signal, said second feedback circuit being arranged to couple said D.-C. negative feedback signal to said input circuit in series-opposition to said D.-C. input signal whereby the D.-C. voltage across said semiconductor element represents the difference between said D.-C. input signal and said D.-C. feedback signal, and a reactance element in said feedback circuit arranged to alter the magnitude of said feedback signal over a relatively long period of time and thereby produce reset action in said control signal.

14. Industrial process control apparatus comprising, in combination, an input circuit arranged to receive an input signal which varies in accordance with a measured process condition, amplifying means coupled to said input circuit to produce an output signal responsive to said input signal, a high-impedance function-generating circuit coupled to said amplifier and responsive to changes in said input signal to produce a function signal which varies with time, a sensing network coupled to the output of said function-generating circuit to develop an A.-C. signal which varies in accordance with changes in said D.-C. function signal, said sensing network including a voltage-controlled capacitor element across which said D.-C. function signal is applied, and circuit means to couple the A.-C. signal produced by said network to said amplifying means so as to alter said output signal in accordance with the variations in said D.-C. function signal.

15. Industrial process control apparatus comprising, in combination, an input circuit arranged to receive an input signal which varies in accordance with a measured process condition, amplifying means coupled to said input circuit to produce an output signal responsive to said input signal, a high-impedance reset-generating circuit coupled to said amplifier and including electrical reactance means responsive to changes in said input signal to produce a reset signal which varies with time, circuit means for combining said reset signal with said input signal, said circuit means including a sensing network coupled to said reset-generating circuit to develop an A.-C. signal which varies in accordance with changes in said reset signal, said sensing network including a voltage-controlled capacitor element across which said reset signal is applied, and coupling means to couple said A.-C. signal to the input of said amplifying means so as to alter the output signal produced thereby in accordance with changes in said reset signal.

16. Industrial process control apparatus comprising, in combination, an input circuit arranged to receive an input signal which varies in accordance with a measured process condition, amplifying means coupled to said input circuit to produce an output signal responsive to said input signal, a high-impedance reset-generating feedback circuit coupling the output of said amplifier to its input and including capacitance means responsive to changes in said input signal to produce a reset signal which gradually decreases with time, a sensing network coupled in said feedback circuit to develop an A.-C. signal which varies in accordance with changes in said D.-C. reset signal, said sensing network including a voltage-controlled capacitor element across which said reset signal is applied, and circuit means to couple said A.-C. signal to the input of said amplifying means so as to alter the output signal produced thereby in accordance with changes in said reset signal.

17. Industrial process control apparatus of the type adapted to furnish an electrical control signal, and wherein the control signal is caused to vary in such a manner as to provide a resetting action operable over a relatively long period of time to slowly increase the control effectiveness; said apparatus comprising an input circuit arranged to receive an input signal which varies in accordance with the value of the process condition to be controlled, a sensing network including voltage-controlled capacitor means coupled to said input circuit, said capacitor means being arranged to establish an electrical capacitance which varies in accordance with the voltage applied thereto without drawing any substantial current from the source of the voltage, supply means for feeding an A.-C. energizing signal to said sensing network, a pair of output terminals for said network, said network including means cooperating with said voltage-controlled capacitor means to produce at said output terminals an A.-C. output signal which varies in response to changes in the capacitance of said capacitor means, an A.-C. amplifier coupled to said output terminals, a reset circuit having a relatively high internal impedance, said reset circuit being coupled to the output of said amplifier to produce a negative feedback signal, said reset circuit further being arranged to couple said negative feedback signal to said voltage-controlled capacitor means to tend to oppose the effect of changes in said input signal, and a reactance element in said feedback circuit arranged to gradually alter the magnitude of said feedback signal over a period of time and thereby produce reset action.

18. An industrial process controller adapted to receive an electrical input signal and to produce a corresponding electrical control signal, comprising an A.-C. amplifier, a positive feedback circuit connected around said amplifier to produce electrical oscillations therein, a sensing network forming part of said positive feedback circuit and including variable attenuation means to control the amplitude of said oscillations, said variable attenuation means comprising a voltage-controlled element, an input circuit for feeding to said sensing network an input signal the magnitude of which is representative of the value of the process condition being controlled, a negative feedback circuit for said A.-C. amplifier, said negative feedback circuit including means to produce a negative feedback signal corresponding in magnitude to the amplitude of oscillations in said A.-C. amplifier, said negative feedback circuit being arranged to couple said feedback signal to said voltage-controlled element to tend to oppose the effects of changes in said input signal, and an output circuit for said controller for producing a control signal in accordance with the amplitude of said electrical oscillations.

19. Industrial process control apparatus comprising, in combination, an input circuit arranged to receive an input signal which varies in accordance with a measured process condition, amplifying means coupled to said input circuit to produce an output signal responsive to said input signal, a high-impedance function-generating circuit coupled to said amplifier and responsive to changes in said input signal to produce a function signal which varies with time, means for feeding said function signal to said input circuit, a sensing network forming part of said input circuit to develop an A.-C. signal which varies in accordance with changes in said function signal, said sensing network including at least one semiconductor element the impedance of which varies with changes in the voltage applied thereto by said function signal, thereby to vary correspondingly the A.-C. signal developed by said sensing network, and circuit means to couple the A.-C. signal produced by said network to said amplifying means so as to alter said output signal in accordance with the variations in said function signal.

References Cited in the file of this patent

UNITED STATES PATENTS

| | | |
|---|---|---|
| 2,182,377 | Guanella | Dec. 5, 1939 |
| 2,191,315 | Guanella | Feb. 20, 1940 |
| 2,193,966 | Jones | Mar. 19, 1940 |
| 2,448,564 | Wilkerson | Sept. 7, 1948 |
| 2,624,796 | Saunders | Jan. 6, 1953 |